(12) United States Patent
Schultheis et al.

(10) Patent No.: US 8,882,488 B2
(45) Date of Patent: Nov. 11, 2014

(54) COMBINED STAMPING AND CUTTING DEVICE FOR MODELING COMPOUND

(75) Inventors: Douglas Arthur Schultheis, Cumberland, RI (US); Ashley Aust, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 275 days.

(21) Appl. No.: 13/442,461

(22) Filed: Apr. 9, 2012

(65) Prior Publication Data

US 2013/0264740 A1   Oct. 10, 2013

(51) Int. Cl.
B28B 1/00   (2006.01)

(52) U.S. Cl.
USPC ........... 425/332; 425/204; 425/294; 425/296; 425/333; 264/163; 366/85; 366/81

(58) Field of Classification Search
CPC ............ A21C 1/06; A21C 1/065; A21C 1/08; A21C 3/06; A21C 14/00; B28B 1/00
USPC .......... 425/204, 294, 296, 332, 333; 264/163; 221/30; 366/85, 81
See application file for complete search history.

(56) References Cited

U.S. PATENT DOCUMENTS

| | | |
|---|---|---|
| 1,164,718 A | 12/1915 | Hill |
| 1,753,834 A | 4/1930 | Ponisch |
| 2,213,784 A | 9/1940 | Landow |
| 2,259,623 A | 10/1941 | Dieckmann |
| D183,650 S | 10/1958 | Gaston |
| D199,249 S | 9/1964 | Barlow |
| 3,171,636 A | 3/1965 | Barlow et al. |
| 3,496,262 A | 2/1970 | Long et al. |
| 3,536,014 A | 10/1970 | Kuchuris |
| 3,572,259 A | 3/1971 | Hayashi |
| 3,817,498 A | 6/1974 | Frankfurth et al. |
| 3,892,510 A | 7/1975 | Meth et al. |
| 3,899,275 A | 8/1975 | Atwood |

(Continued)

FOREIGN PATENT DOCUMENTS

| | | |
|---|---|---|
| DE | 19924826 A1 | 5/1999 |
| FR | 1439866 A | 4/1966 |
| JP | 62277141 A | 12/1987 |

OTHER PUBLICATIONS http://www.youtube.com/watch?v=pfYYA9LqTt0 (trade show video, posted Feb. 12, 2012).*

(Continued)

*Primary Examiner* — Timothy Kennedy
*Assistant Examiner* — David N Brown, II
(74) *Attorney, Agent, or Firm* — Perry Hoffman (57) ABSTRACT

A combined a toy which simply yet uniquely stamps and cuts off formed articles in a fun and interesting way utilizing cooperating rollers which employ a stamp and at least one angular projection defining a cutting edge on at least one roller. Two or more cooperating rollers are at a frame with each roller including a peripheral surface, one or more concentric ribs on the peripheral surface of each roller which cooperate to spiral around the length of each roller defining a molding surface which spirals around the peripheral surface of each roller, and a stamp on the molding surface of at least one roller. The driving mechanism rotates a gear mechanism which in turn rotates the two or more rollers that cooperate to stamp and cut off articles formed on the molding surface of the rollers.

20 Claims, 6 Drawing Sheets

(56) References Cited

U.S. PATENT DOCUMENTS

| | | |
|---|---|---|
| 3,937,314 A | 2/1976 | Rosenberg et al. |
| 4,076,476 A | 2/1978 | Ventura |
| D268,043 S | 2/1983 | Orenstein |
| 4,469,476 A | 9/1984 | Cavanagh et al. |
| 4,560,086 A | 12/1985 | Stol |
| 4,569,815 A | 2/1986 | Rentz et al. |
| 4,815,961 A | 3/1989 | Kindred |
| D306,885 S | 3/1990 | Koch |
| 4,993,932 A | 2/1991 | D'Andrade |
| 5,314,373 A | 5/1994 | Caveza et al. |
| 5,344,234 A | 9/1994 | Caveza |
| 5,346,423 A | 9/1994 | Caveza et al. |
| 5,480,335 A | 1/1996 | Caveza |
| D369,837 S | 5/1996 | Kino |
| 5,562,927 A | 10/1996 | Masuda et al. |
| 5,678,474 A | 10/1997 | Hall |
| D403,378 S | 12/1998 | Lebensfeld et al. |
| 5,871,783 A | 2/1999 | Capodieci |
| 5,902,621 A | 5/1999 | Beckett et al. |
| 5,996,476 A | 12/1999 | Schultz |
| 6,206,009 B1 | 3/2001 | Paxson |
| D451,524 S | 12/2001 | Morris |
| 6,602,066 B1 | 8/2003 | Heayes |
| D484,194 S | 12/2003 | Daftari |
| D495,377 S | 8/2004 | Jarvis et al. |
| D499,146 S | 11/2004 | Liu et al. |
| 7,275,924 B1 | 10/2007 | Kreuzer et al. |
| 2002/0098255 A1 | 7/2002 | Ayash |
| 2008/0060147 A1 | 3/2008 | Parton |
| 2010/0046318 A1 | 2/2010 | Holt et al. |

OTHER PUBLICATIONS http://www.youtube.com/watch?v=M8XY9GNgtv0 (trade show video, posted Feb. 19, 2012).* http://toysrustoybox.co.uk/2012/11/17/play-doh-candy-cyclone/ (posted Nov. 17, 2012).*

Non-Final Official Action papers including examiner notice of references cited from Design U.S. Appl. No. 29/417,773, dated Jul. 17, 2014.

* cited by examiner

COMBINED STAMPING AND CUTTING DEVICE FOR MODELING COMPOUND

BACKGROUND OF THE INVENTION

1. Field of the Invention

The present invention relates to toy molding and cutting devices, and more particularly to a combined toy for simply yet uniquely stamping and cutting off formed articles in a fun and interesting way though rotation of a single driving mechanism. The invention also relates to a method for stamping and cutting off formed articles.

2. Background of the Invention

There are many known devices for manipulating formable materials or modeling compound in various ways such as extruding, propelling, molding and slicing formed articles. Many of the known devices employ extruders or auger like mechanisms to propel a formable material toward a second mechanism for further manipulation of the formable material. A couple of the known devices slice or shred materials with slicing rollers and shredders employing a hand crank. None of the known devices however, employ cooperating rollers which form and stamp the formable material at a molding surface of the rollers and further cut off articles formed by the rollers by further employing an angular projection defining a cutting edge at a final rib of the cooperating rollers.

There are several known devices which employ an auger like mechanism to extrude or propel a formable material through a cylindrical passage toward a second mechanism for further manipulation. The formable material is further extruded through a stationary perforated plate, as exemplified and disclosed in U.S. Pat. No. 2,259,623, issued Oct. 14, 1940 to C. W. Dieckmann. The auger in Dieckmann has a spider attached to a forward end with knife blades on each spider arm to rotate across the inner face of the stationary plate thereby cutting material pressed against the plate by the auger and discharging it through the perforations.

Other known molding devices employing an auger like mechanism propel the formable material to an extrusion nozzle, as exemplified and disclosed in U.S. Pat. No. 3,572,259 issued Jul. 8, 1969 to Hayashi. The extruded formable material is then separated into individual pieces by external cutters. Another known device employing an auger like mechanism presents the formable material to a dough divider as exemplified and disclosed in US Patent Publication No. US 2002/0098255 A1 published Jul. 25, 2002 to Ayash. The formable material is pushed along by the auger like mechanism through the dough divider to create multiple substreams of formable material.

Another known device employing an auger like mechanism includes a plurality of teeth along a spiral edge of an auger, as exemplified and disclosed in German Patent No. DE 199 24 826 A 1 issued May 5, 1999 to Blumenschein. The teeth extend along only part of the spiral edge of the auger and are absent at the final turn of the spiral edge. The teeth appear to engage a second mechanism to ride along the teeth and rotate the auger.

There are also several known devices employing a nozzle to propel a flowable material onto a support structure for further embossing or molding. The nozzle extrudes or propels the flowable material onto a support structure as exemplified and disclosed in U.S. Pat. No. 3,496,262 issued Feb. 17, 1970 to Long et al. or into a storage area as exemplified and disclosed in U.S. Pat. No. 4,569,815 issued Feb. 11, 1986 to Rentz et al. Long et al further discloses a strip of flowable material extruding from the nozzle and then embossed with an embossing roller to define a pattern on a surface of the strip. Rentz et al, on the other hand, further discloses a piston propelling the flowable material and a manually operable lever means pivoting about the piston to express flowable material into the storage area which is operable with different receiving members for simultaneously propelling and embossing of the flowable material.

There are also known devices for manipulating formable materials employing slicing rollers and shredders. A device employing a pair of cutter rollers is rotatably supported and driven by a gear mechanism to slice formable material, such as bread, into a plurality of elongated segments, as exemplified and disclosed in U.S. Pat. No. 5,346,423 issued Sep. 13, 1994 to Caveza et al. The formable material is fed into the cutting rollers which are manually rotated to simultaneously slice the material in numerous places producing a plurality of elongated segments. In another device a shredder is employed and connected to a hand crank for shredding chewing gum, as exemplified and disclosed in U.S. Pat. No. 5,480,355 issued Jan. 2, 1996 to Caveza.

Significantly, known molding and cutting devices do not include a combined mechanism for simply yet uniquely stamping and cutting off formed articles in a fun and interesting way though rotation of a single drive mechanism. It would be desirable to provide a toy having cooperating rollers with a stamp on a molding surface of the rollers and at least one angular projection defining at least one cutting edge along a final rib of at least one roller. A gear mechanism is in mechanical communication with the cooperating rollers and a driving mechanism is in mechanical communication with the gear mechanism, such that rotation of the driving mechanism rotates the rollers that cooperate to stamp and cut off articles formed on the molding surface of the rollers.

SUMMARY OF THE INVENTION

The present invention addresses shortcomings of the prior art to provide a toy which simply yet uniquely stamps and cuts off formed articles in a fun and interesting way utilizing cooperating rollers which employ a stamp and at least one angular projection defining a cutting edge on at least one roller.

In one embodiment of the invention, a toy includes a frame, two or more cooperating rollers at the frame with each roller including a peripheral surface, and one or more concentric ribs on the peripheral surface of each roller cooperating to spiral around the length of each roller defining a molding surface which spirals around the peripheral surface of each roller. Further included is a stamp on the molding surface of at least one roller, at least one angular projection defining a cutting edge along a final rib of at least one roller, a gear mechanism at the frame and in mechanical communication with the cooperating rollers, and a driving mechanism secured to the frame and in mechanical communication with the gear mechanism, such that the driving mechanism rotates the gear mechanism which in turn rotates the two or more rollers that cooperate to stamp and cut off articles formed on the molding surface of the rollers.

In another embodiment of the invention, two angular projections defining two cutting edges angularly spaced opposite each other along the final rib of each roller are further included. In another embodiment, a third roller cooperating with the two or more rollers and positioned in a triangular arrangement is further included, and the third roller includes a peripheral surface and one or more concentric ribs on the peripheral surface cooperating to spiral around the length of the roller defining a molding surface which spirals around the peripheral surface of the roller. In another embodiment, two angular projections defining two cutting edges on a final rib of the third roller is included.

In yet another embodiment of the invention, the rollers each include a first end and a second end and the ribs of each roller spiral down from the first end to the second end, the ribs of each roller are in an alternating pattern wherein each roller has ribs positioned under the ribs of an adjacent roller to one side and over the ribs of an adjacent roller to the other side of the triangular arrangement. In still yet another embodiment, a hollow housing secured to the frame is included and at least partially contains the rollers. In another embodiment, an access door pivotably secured to the housing is further included.

In another embodiment of the invention, the housing further comprises an inlet and an outlet, wherein the first ends of the rollers surround the inlet and the second ends of the rollers surround the outlet, and wherein the cutting edges on the final rib of each roller cross over the cutting edge of an adjacent roller of the triangular arrangement at the outlet. In another embodiment, a collar extending from the inlet into the housing and one or more guide members extending from the collar and positioned adjacent the first end of the rollers are further included, and in another embodiment, the driving mechanism includes a handle.

In one embodiment of the invention, a toy includes a frame, three cooperating augers in a triangular arrangement at the frame, each auger including a peripheral surface and one or more ribs at the peripheral surface, a molding surface defined by the one or more ribs at the peripheral surface of each auger, a stamp on the molding surface of at least one auger, and at least one angular projection defining at least one cutting edge along a final rib of at least one auger. The toy further includes a gear mechanism at the frame and in mechanical communication with the cooperating augers, and a driving mechanism secured to the frame and in mechanical communication with the gear mechanism, such that the driving mechanism rotates the gear mechanism which in turn rotates the three cooperating augers that stamp and cut off articles formed on the molding surface of the augers.

In another embodiment of the invention, two angular projections defining two cutting edges are angularly spaced opposite each other on a final rib of each auger. In another embodiment, a housing is further included and secured to the frame having an inlet and an outlet and at least partially containing the cooperating augers.

In yet another embodiment, a collar extending from the inlet into the housing and one or more guides extending from the collar and positioned adjacent the augers is further included. In still yet another embodiment, each auger includes a first end and a second end and tapers down from the first end to the second end, the first ends of the augers surround the inlet and the second ends of the augers surround the outlet and each cutting edge on the final rib of each auger crosses over the cutting edge of an adjacent auger of the triangular arrangement at the outlet.

In another embodiment of the invention, a method for stamping and cutting off formed articles includes the steps of providing a frame, providing two or more cooperating rollers at the frame, each roller including a peripheral surface with a rib spiraling around the peripheral surface of each roller defining a molding surface at each roller, providing a stamp on the molding surface of at least one roller, and providing at least one angular projection defining at least one cutting edge along a final turn of the rib of at least one roller. The method further includes the steps of providing a gear mechanism at the frame in mechanical communication with the cooperating rollers, and providing a driving mechanism secured to the frame and in mechanical communication with the gear mechanism, such that rotating the driving mechanism rotates the gear mechanism and in turn rotates the two or more rollers for stamping and cutting off articles formed at the molding surface of the rollers.

In yet another embodiment of the invention, the step of providing two angular projections defining two cutting edges angularly spaced opposite each other on the final turn of the rib of each roller is further included. In another embodiment, the method further includes the step of providing a third roller cooperating with the two or more rollers in a triangular arrangement, the third roller including a peripheral surface and a rib spiraling around a length of the peripheral surface of the roller defining a molding surface which spirals around the peripheral surface of the roller, and in another embodiment, the step of providing at least one angular projection defining at least one cutting edge on a final turn of the rib of the third roller is further included.

In still yet another embodiment, the step of providing a hollow housing, having an inlet and an outlet secured to the frame and at least partially containing the rollers is further included along with the step of the driving mechanism including a handle secured to the frame. In another embodiment, the method further includes the step of providing a collar extending from the inlet into the housing and one or more guides extending from the collar and positioned adjacent the rollers.

Briefly the present inventions provide a unique toy having cooperating rollers at a frame with a stamp on at least one molding surface of the rollers and at least one angular projection defining at least one cutting edge along a final rib of at least one roller. A gear mechanism is in mechanical communication with the cooperating rollers and a driving mechanism is in mechanical communication with the gear mechanism such that the combined toy simply yet uniquely stamps and cuts off articles formed on the molding surface of the rollers in a fun and interesting way.

BRIEF DESCRIPTION OF THE DRAWINGS

For the purpose of facilitating an understanding of the inventions, the accompanying drawings and description illustrate a preferred embodiment thereof, from which the inventions, structure, construction and operation, and many related advantages may be readily understood and appreciated.

DESCRIPTION OF THE EMBODIMENTS

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope to the present invention.

Figure 1:
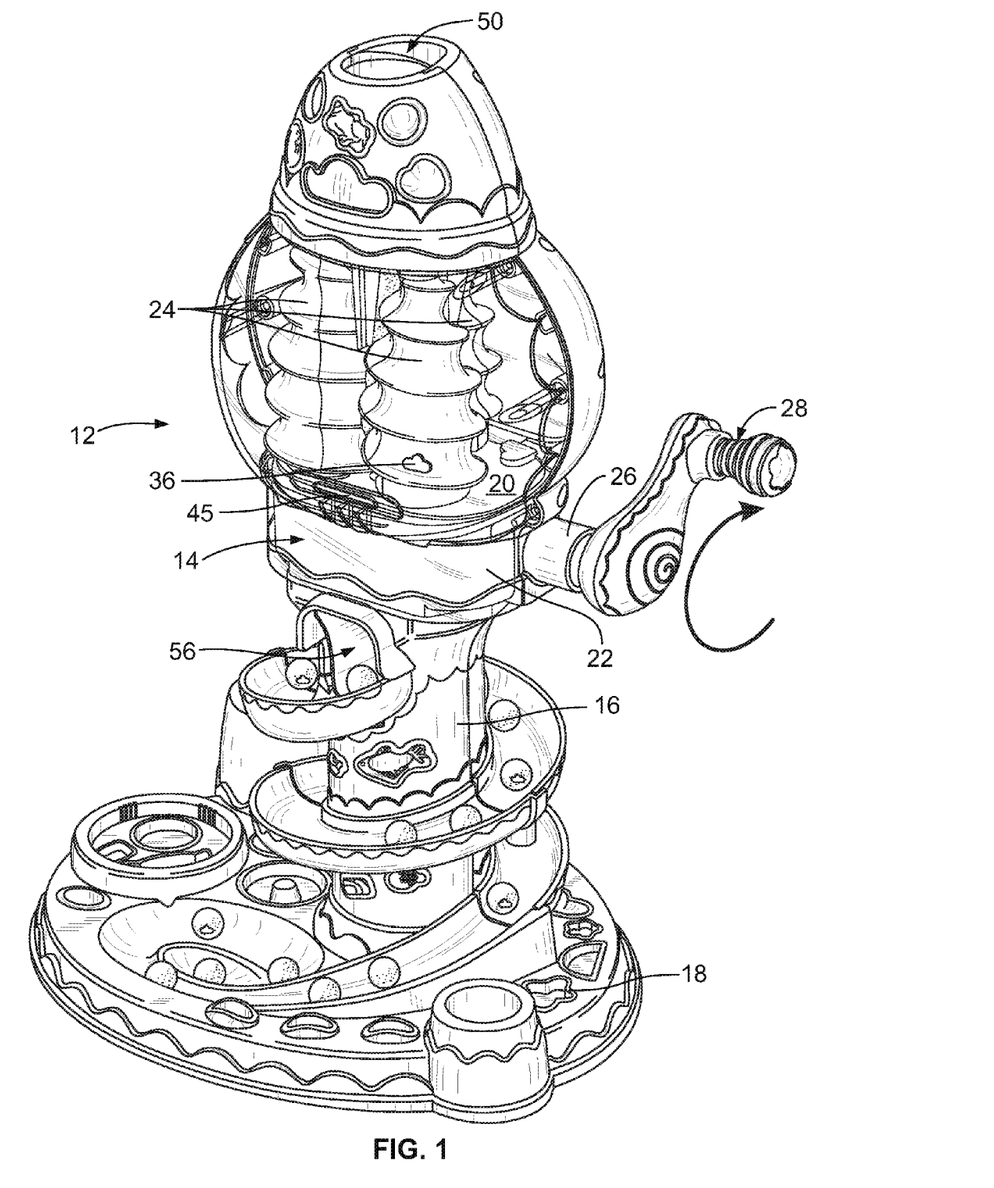
FIG. 1 is a perspective view of a toy of the present invention illustrating cooperating rollers/augers at a frame and a drive mechanism rotatable in a clockwise direction.

A combined toy 12, as seen in FIG. 1, is generally seen to include cooperating rollers in communication with a single driving mechanism for simply yet uniquely stamping and cutting off formed articles in a fun and interesting way. The toy 12, is generally shaped to look like a gum ball machine which drops gumballs of formable material, as seen in FIG. 1, and includes a frame 14 and a stand 16 which holds the frame 14 upright and connects to a platform 18 that rests on a surface. In the present described embodiment, the frame 14, stand 16 and platform 18 are all manufactured from a heavy duty rigid plastic which is simple and inexpensive to manufacture into any desired shape and can easily include fun colors and patterns. It is also contemplated that the toy 12 can include alternative shapes, such as a globe or bank, etc. and can also include alternative suitable materials such as wood or metal.

The frame 14 includes a platform portion 20 and a compartment 22. The platform portion 20 is generally a deck surface which sits underneath the cooperating rollers 24 and the compartment 22 further includes an extending tube portion 26 for rotatably securing the single driving mechanism 28 to the frame 14.

Figure 2:
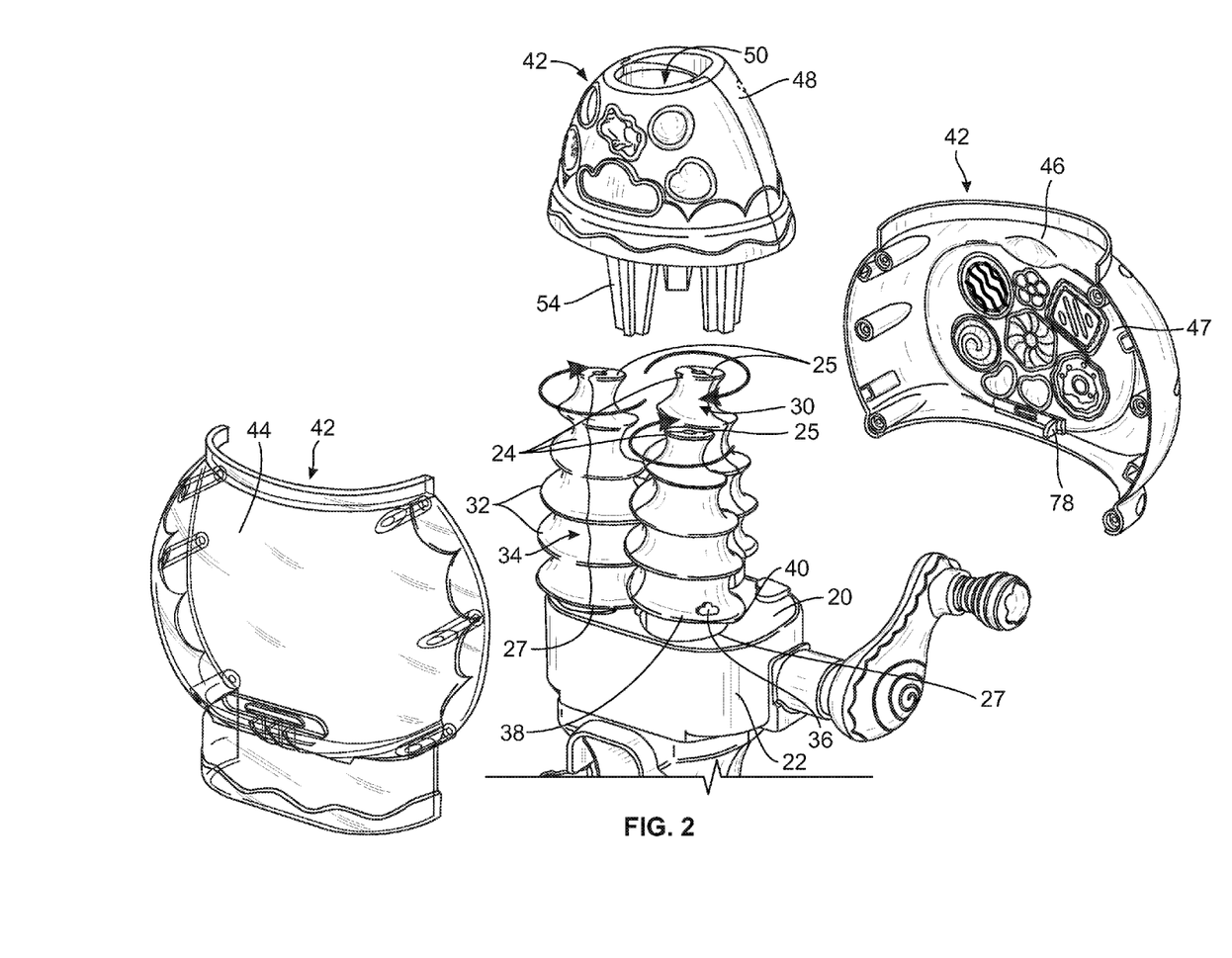
FIG. 2 is an exploded view illustrating three sections of a housing removed from the frame exposing three cooperating rollers/augers in a triangular arrangement rotatable in a clockwise direction and one or more stamps on a molding surface of at least one roller/auger.
Figure 3A:
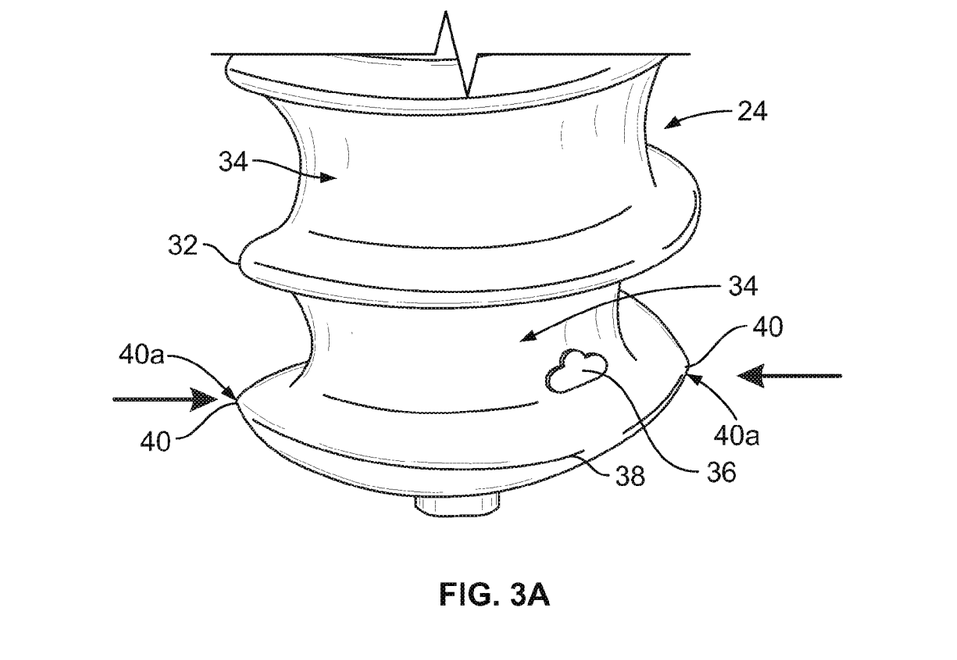
FIG. 3A illustrates the stamp positioned between two angular projections.
Figure 3B:
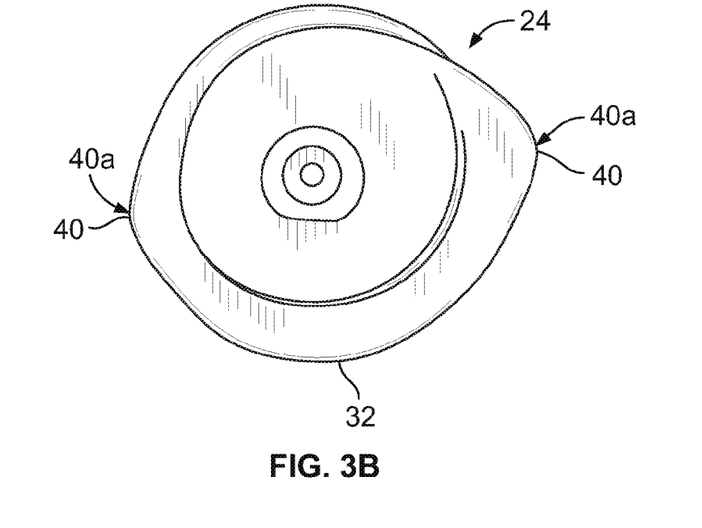
FIG. 3B illustrates two angular projections defining two cutting edges angularly spaced opposite each other along a final rib of a roller/auger.

The cooperating rollers 24, as seen in FIGS. 1-3, include two or more cooperating rollers at the frame 14. A third roller at the frame 14, cooperating with the two or more rollers, can be further included and in the present described embodiment, three rollers 24 are positioned in a triangular arrangement at the platform portion 20 of the frame, as seen in FIG. 2, and cooperate to stamp and cut off articles formed on the rollers. Alternatively, the cooperating rollers 24 can be described as cooperating augers 24 which function and have a structure identical to the cooperating rollers 24.

Each roller/auger 24 includes a peripheral surface 30 and one or more concentric ribs 32 on the peripheral surface of each roller cooperating to spiral around the length of each roller defining a molding surface 34 which also spirals around the peripheral surface of each roller, as seen in FIG. 2. Alternatively, each roller/auger 24 can also be seen to include a single rib 32 spiraling around the peripheral surface of each roller defining a molding surface 34 between each turn of the rib as it spirals around the roller.

In the present described embodiment, as seen in FIG. 2, three rollers/augers 24 are rotatably secured to the frame 14 in an elongated, or vertical, triangular arrangement and the rollers each include a first end 25 and a second end 27. The rib/ribs of each roller spiral down from the first end 25 to the second end 27, and are in an alternating pattern such that each roller has ribs positioned under the rib/ribs of an adjacent roller to one side and over the rib/ribs of an adjacent roller to the other side of the triangular arrangement. The triangular arrangement of the rollers and the alternating pattern of the rib/ribs of each roller work to draw the formable material into the rollers for forming articles on the molding surfaces of the rollers.

Additionally the rollers/augers are manufactured from a heavy duty rigid plastic material which is simple and inexpensive to manufacture into any desired shape and can easily include fun colors and patterns. In the present described embodiment, each roller includes two different colors divided vertically along each roller providing a fun color display when the rollers are rotated.

A stamp 36, as seen in FIG. 3A, is included on the molding surface 34 of at least one roller/auger 24. The stamp 36 can include a variety of shapes, figures or impressions, and can be attached to the rollers/augers or integral with the molding surface 34 of at least one roller/auger. In the present described embodiment the stamp 36 includes a "PLAY-DOH™" trademark symbol integral with the molding surface 34 of each roller/auger. Also, in the present described embodiment, the stamp 36 is included on each of the three rollers in the triangular arrangement and positioned on the molding surface 34 at the second end 27 of each roller 24 just before a final rib 38 or a final turn 38 of the rib of each roller.

At least one angular projection 40, as seen in FIGS. 2 and 3, is included along the final rib 38 or the final turn 38 of at least one roller/auger 24. The angular projection 40 defines a cutting edge 40a along the final rib 38 or the final turn 38 of at least one roller 24. In the present described embodiment, as seen in FIGS. 3A and 3B, two angular projections 40 defining two cutting edges 40a are angularly spaced opposite each other along the final rib or turn 38 of each roller. The angular projections 40 and cutting edges 40a of each roller/auger line up together while the rollers/augers are rotating to completely cut through the formable material to separate each formed article from the next. Additionally, the stamp 36 is positioned on the molding surface 34 between the two angularly spaced projections of each roller, as seen in FIG. 3A, for optimal stamping of articles formed on the molding surfaces 34 of the rollers 24 just before the articles are completely cut off from each other at the cutting edges 40a.

Modeling compounds are well-known and commonly been used by children in their play activities. Apparatus and methods of various sophistication are known for forming modeling compound materials such as the popular PLAY-DOH™ formable material, colored plastic material, plasticene, modeling clay or the like. Such modeling compounds and the like are used by children to form a variety of shapes, articles or artwork. Modeling compounds may be molded with tools, by hand or by molds. Additionally, extrusion and template apparatus may be used. Children typically use such apparatus to fashion modeling compounds into a wide variety of desirable shapes, for example, animals, flowers, artwork or to form fanciful designs and the like.

As seen in FIGS. 1-2, a hollow housing 42 is secured to the frame 14 at the platform 20 and at least partially contains the rollers/augers 24. The housing 42 includes three sections, front section 44, rear section 46 and top section 48, as seen in FIG. 2. In the present described invention, the housing is manufactured from a heavy duty rigid plastic material which is simple and inexpensive to manufacture into any desired shape and can include half molds at the housing sections and can easily include fun colors and patterns. Also, in the present described invention, all three rollers/augers are contained within the housing and can be viewed though the clear front section 44, of the housing. The front section 44 further includes a clean out slot 45 adjacent the platform 20 of the frame to aid in cleaning out any formable material that may become stuck in the housing Additionally, the rear section 46 includes an access door 47 pivotably secured to the housing allowing a user access to the rollers/augers and formable material that has been inserted into the housing 42.

Figure 4:
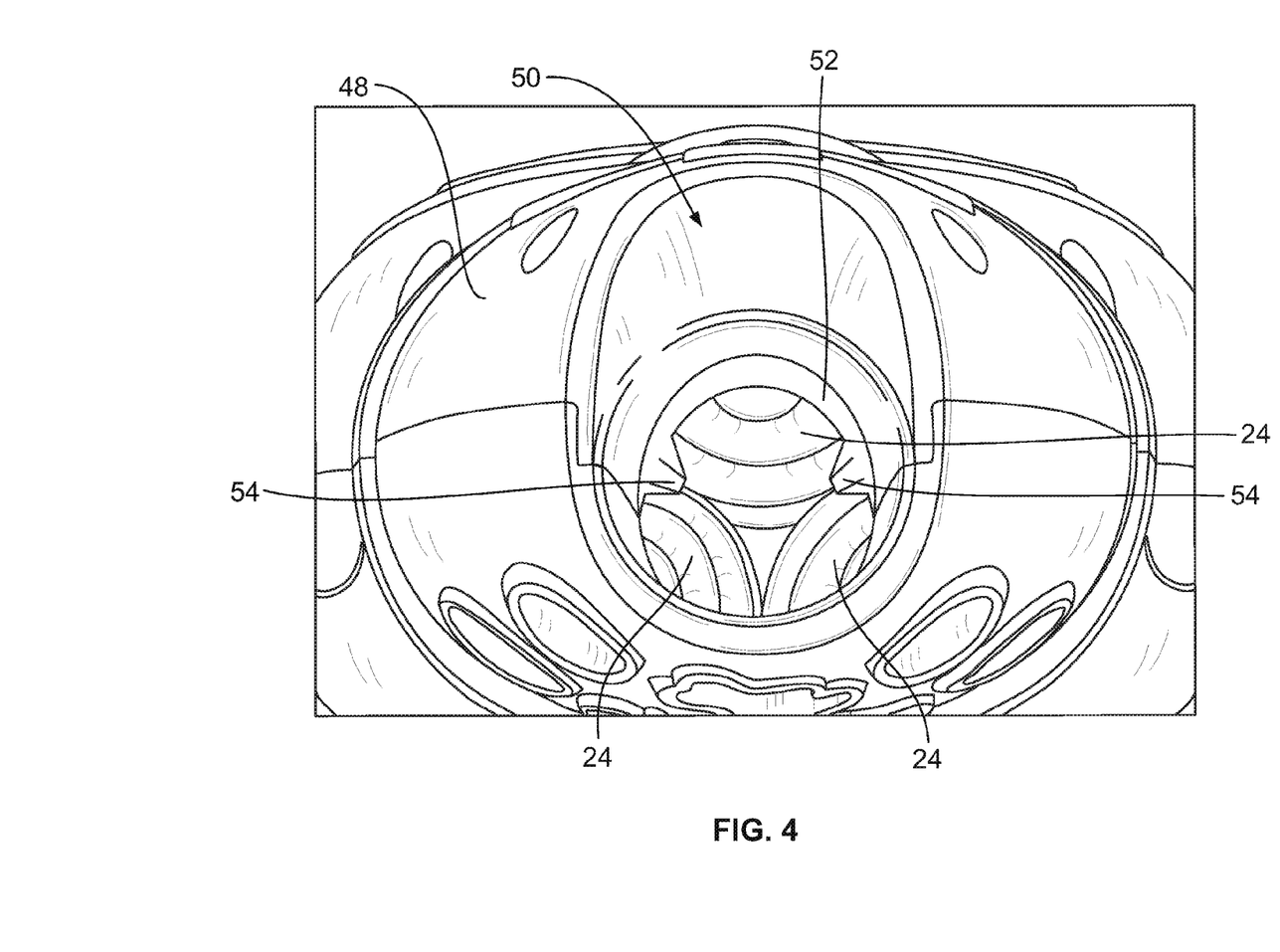
FIG. 4 is a top perspective view illustrating an inlet, a collar extending from a top housing section, and three cooperating rollers in a triangular arrangement.
Figure 5:
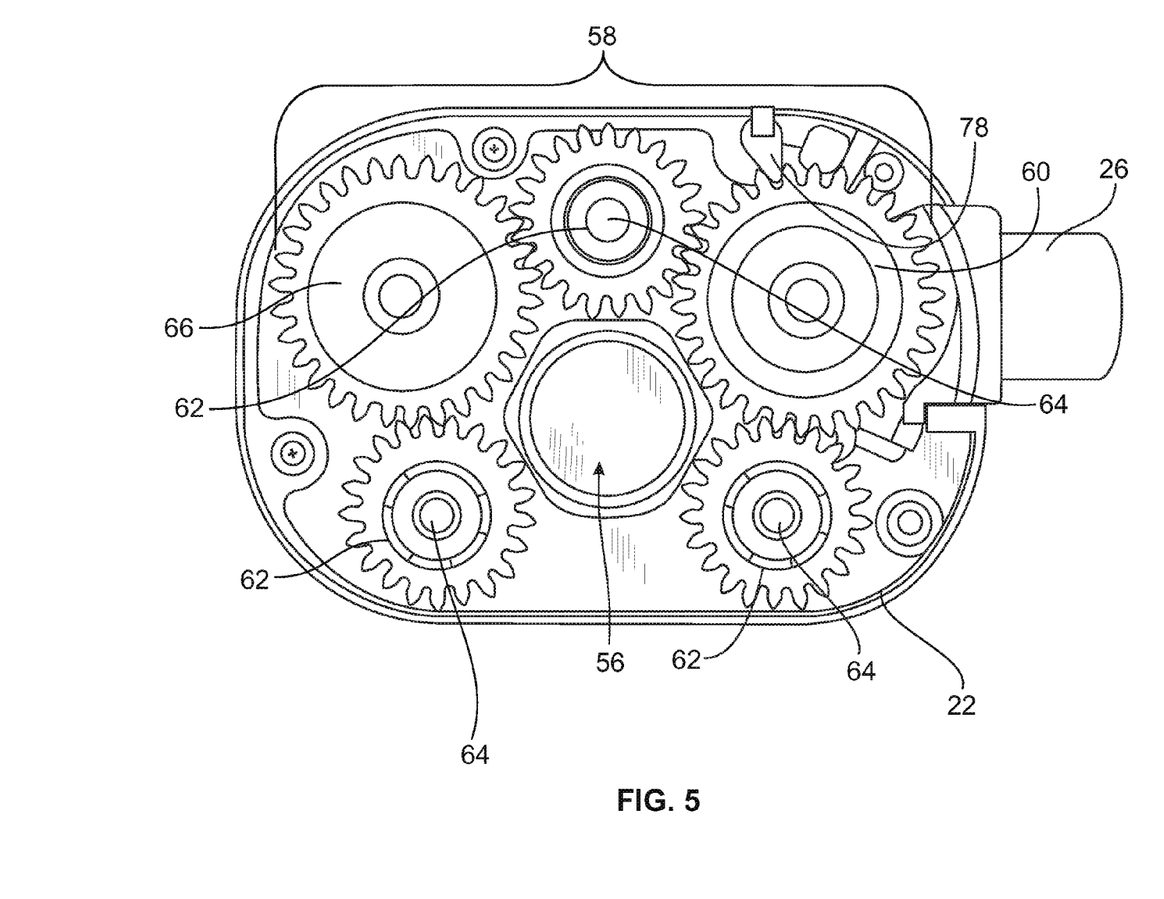
FIG. 5 is a plan view of a gear mechanism in mechanical communication with the two or more rollers and the driving mechanism.
Figure 6:
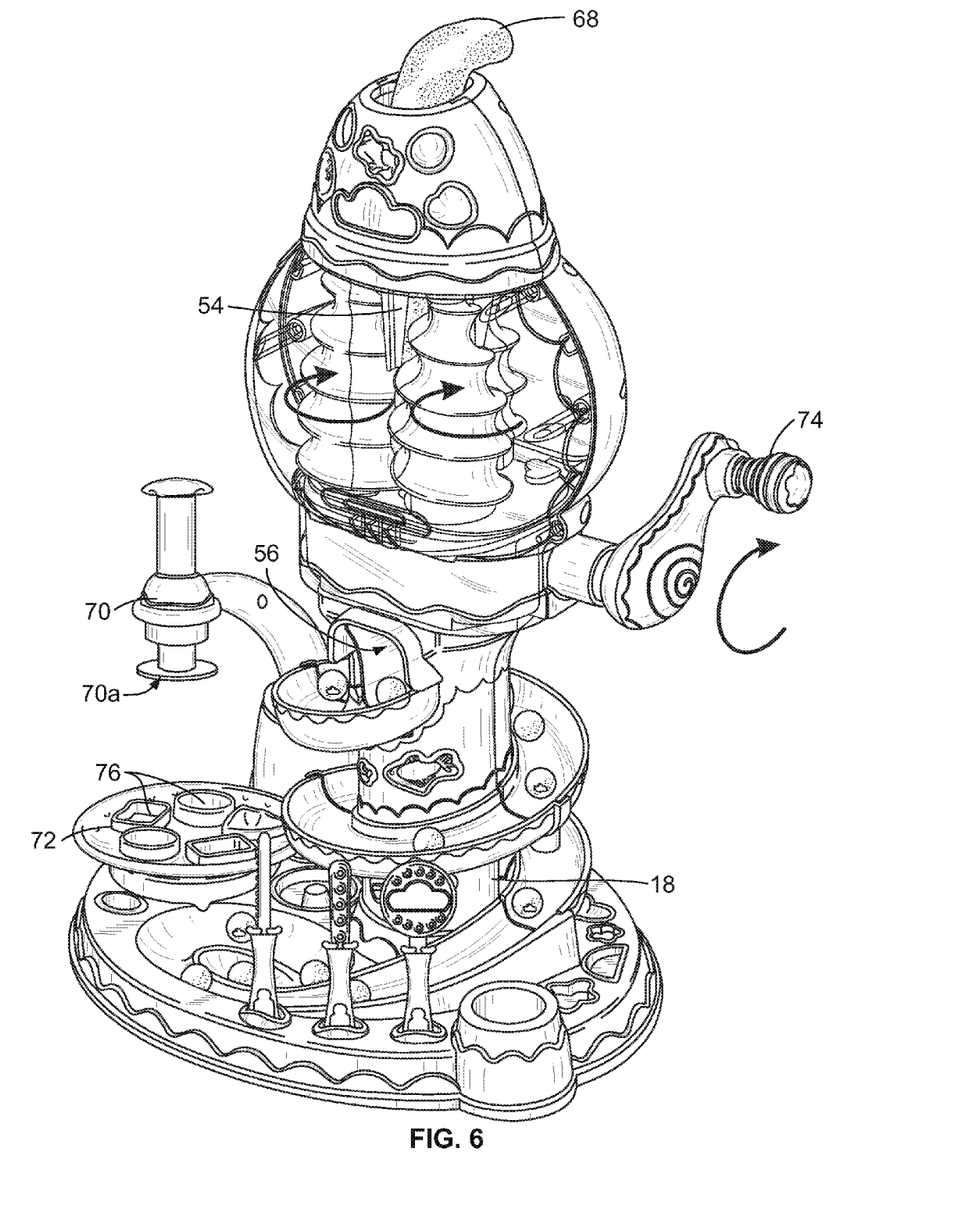
FIG. 6 illustrates a formable material inserted into the inlet and stamped articles formed on the rollers/augers exiting an outlet of the housing.

Additionally, the top section 48, as seen in FIGS. 2 and 4 includes a housing inlet 50 for inserting the formable material 68 into the housing to be molded and cut into formed articles, as seen in FIGS. 2 and 6. The top section 48 further includes a collar 52, as seen in FIG. 4, extending from the inlet 50 into the housing and one or more guide members 54 extending from the collar and positioned adjacent the first end 25 of the rollers/augers, as seen in FIGS. 1 and 2. In the present described embodiment, three guide members 54 are integral with and extend from the collar 52 and each are positioned adjacent the first ends 25 of the rollers/augers. The guide members 54 form a barrier between adjacent rollers to keep the formable material 68 in between the triangular arrangement of the three rollers/augers. The housing 42, further includes an outlet 56, as seen in FIGS. 5 and 6 which travels through the frame as a common outlet 56, as seen in FIG. 5, such that stamped and formed articles exit the housing and the frame through common outlet 56.

In the present described embodiment, the first ends 25 of the rollers/augers surround the inlet 50 and are tapered at the first ends 25 such that as the rollers rotate the narrower, tapered, first ends 25 will pull formable material, that has been inserted into the inlet 50, into the rollers. The second ends 27 of the rollers/augers surround the outlet 56 and the cutting edges 40a on the final rib of each roller crosses over the cutting edges 40a on the final rib of an adjacent roller of the triangular arrangement at the outlet 56. The articles formed on the molding surfaces of the rollers/augers are optimally cut and separated from each other before they drop into the outlet 56.

The gear mechanism 58 is housed in the compartment 22 at the frame 14 and is in mechanical communication with the cooperating rollers 24. The driving mechanism 28 is secured to the frame 14 at the extending tube portion 26 and is in mechanical communication with the gear mechanism 58. In the present described embodiment, the gear mechanism 58 includes at least two or more supporting gears 62 which each include a pin 64 for securely mounting the two or more rollers/augers on the supporting gears 62. In the present described invention, three supporting gears 62 are arranged in a triangular arrangement within compartment 22 and each gear 62 securely mounts a roller/auger on pin 64. All three supporting gears with mounted rollers/augers are rotated simultaneously in the same clockwise direction when the driving mechanism 28 rotates the gear mechanism 58.

In the present described invention, a first gear 60 is in mechanical communication with the driving mechanism 28 and transfers the rotation of the driving mechanism through each gear of the gear mechanism 58 in a chain like reaction. The driving mechanism 28 rotates in a clockwise direction and rotates the first gear 60 in a counter clockwise direction. The first gear 60 is in mechanical communication with two supporting gears 62, one on each side of the first gear 60, and rotates the supporting gears 62 in a clockwise direction. Further, a second gear 66 is in mechanical communication with the supporting gear 62 that communicates with the first gear 60 which transfers the rotation to the second gear 66, rotating the second gear in a counter clockwise direction. Lastly, the second gear 66 is in mechanical communication with the last of the three supporting gears 62 rotating this supporting gear 62 in a clockwise direction. It is also contemplated that the driving mechanism and three supporting gears 62 can be rotated in a counter clockwise direction, and the first and second gears 60 and 66 can be rotated in a clockwise direction.

In use, the driving mechanism 28 rotates the gear mechanism 58 which in turn rotates the two or more rollers/augers that cooperate to stamp and cut off articles formed on the molding surface of the rollers/augers. In the present described embodiment, the driving mechanism 28 includes a handle or hand crank 70, as seen in FIG. 6, and in use, formable material 68 is inserted into the inlet 50 by a user who then rotates the handle 70 in a clockwise direction which in turn rotates the gear mechanism 58 the three attached rollers/augers 24. The formable material 68 is pulled onto the molding surfaces 34 of the rollers as the formable material travels from the inlet 50 to the outlet 56. The rollers/augers 24 cooperate to stamp and cut off round ball shaped articles formed on the molding surfaces 34 and drop the articles into the outlet 56.

Additionally, the handle or hand crank 70 and rollers/augers 24 are prevented from rotating when the access door 47 to the housing is opened. A stop member 78, as seen in FIGS. 2 and 5, is in mechanical communication with the access door 47 and engages teeth of the first gear 60 when the access door 47 is opened preventing first gear 60 from rotating, as seen in FIG. 5. Closing access door 47 will cause stop member 78 to disengage from first gear 60 allowing free rotation of the gear mechanism 58 and communicating handle 70 and rollers/augers 24.

In the present described embodiment additional toys for manipulating the formable material 68 can be added to the platform 18 to further enhance play, as seen in FIG. 6. A spring loaded stamp 70 attaches to the platform 18 and includes a flat stamping surface 70a to flatten the formable material. A plate 72 having half molds 76 angularly spaced around the perimeter of the plate is included beneath the stamp 70. The plate 72 can rotate beneath the stamp 70 so different half molds can line up with the stamping surface 70a of the stamp 70. In use, the formed ball shaped articles of formable material can be put into a half mold of the plate 72 by a user and pressed into the half mold by the stamping surface 70a. The stamp 70 will spring back up to a ready position after flattening the round ball of formable material into the half mold.

A method for stamping and cutting off articles includes the steps of providing a frame, providing two or more cooperating rollers at the frame, each roller including a peripheral surface with a rib spiraling around the peripheral surface of each roller defining a molding surface at each roller, providing a stamp on the molding surface of at least one roller, and providing at least one angular projection defining at least one cutting edge along a final turn of the rib of at least one roller. Further providing a gear mechanism at the frame in mechanical communication with the cooperating rollers, providing a driving mechanism secured to the frame and in mechanical communication with the gear mechanism, and rotating the driving mechanism rotates the gear mechanism and in turn rotates the two or more rollers for stamping and cutting off articles formed at the molding surface of the rollers.

The method further includes the step of providing two angular projections defining two cutting edges angularly spaced opposite each other on the final turn of the rib of each roller. The method further includes the step of providing a third roller cooperating with the two or more rollers in a triangular arrangement, the third roller including a peripheral surface and a rib spiraling around a length of the peripheral surface of the roller defining a molding surface which spirals around the peripheral surface of the roller.

Additionally, the method further includes the step of providing at least one angular projection defining at least one cutting edge on a final turn of the rib of the third roller, and further includes the step of providing a hollow housing, having an inlet and an outlet secured to the frame and at least partially containing the rollers and wherein the driving mechanism includes a handle secured to the frame. Also, the method further includes the step of providing a collar extending from the inlet into the housing and one or more guides extending from the collar and positioned adjacent the rollers.

From the foregoing, it can be seen that there has been provided a toy which simply yet uniquely stamps and cuts off formed articles in a fun and interesting way utilizing cooperating rollers which employ a stamp and at least one angular projection defining a cutting edge on at least one roller. While a particular embodiment of the present invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A toy, comprising:
    a frame;
    two or more cooperating rollers at the frame, each roller including a peripheral surface;
    one or more concentric ribs on the peripheral surface of each roller cooperating to spiral around the length of each roller defining a molding surface which spirals around the peripheral surface of each roller;
    a stamp on the molding surface of at least one roller;
    at least one angular projection defining a cutting edge along a final rib of at least one roller;
    a gear mechanism at the frame and in mechanical communication with the cooperating rollers; and
    a driving mechanism secured to the frame and in mechanical communication with the gear mechanism;
    wherein the driving mechanism rotates the gear mechanism which in turn rotates the two or more rollers that cooperate to stamp and cut off articles formed on the molding surface of the rollers.

2. The toy according to claim 1, further comprising two angular projections defining two cutting edges angularly spaced opposite each other along the final rib of each roller.

3. The toy according to claim 2, further comprising a third roller cooperating with the two or more rollers and positioned in a triangular arrangement, the third roller including a peripheral surface and one or more concentric ribs on the peripheral surface cooperating to spiral around the length of the roller defining a molding surface which spirals around the peripheral surface of the roller.

4. The toy according to claim 3, further comprising two angular projections defining two cutting edges on a final rib of the third roller.

5. The toy according to claim 4, wherein the rollers each include a first end and a second end and the ribs of each roller spiral down from the first end to the second end, the ribs of each roller are in an alternating pattern wherein each roller has ribs positioned under the ribs of an adjacent roller to one side and over the ribs of an adjacent roller to the other side of the triangular arrangement.

6. The toy according to claim 5, further comprising a hollow housing secured to the frame and at least partially containing the rollers, and further comprising an access door pivotably secured to the housing.

7. The toy according to claim 6, wherein the housing further comprises an inlet and an outlet, wherein the first ends of the rollers surround the inlet and the second ends of the rollers surround the outlet, and wherein the cutting edges on the final rib of each roller cross over the cutting edge of an adjacent roller of the triangular arrangement at the outlet.

8. The toy according to claim 7, further comprising a collar extending from the inlet into the housing and one or more guide members extending from the collar and positioned adjacent the first end of the rollers.

9. The toy according to claim 8, wherein the driving mechanism includes a handle.

10. A toy comprising:
    a frame;
    three cooperating augers in a triangular arrangement at the frame, each auger including a peripheral surface and one or more ribs at the peripheral surface;
    a molding surface defined by the one or more ribs at the peripheral surface of each auger;
    a stamp on the molding surface of at least one auger;
    at least one angular projection defining at least one cutting edge along a final rib of at least one auger;
    a gear mechanism at the frame and in mechanical communication with the cooperating augers; and
    a driving mechanism secured to the frame and in mechanical communication with the gear mechanism;
    wherein the driving mechanism rotates the gear mechanism which in turn rotates the three cooperating augers that stamp and cut off articles formed on the molding surface of the augers.

11. The toy according to claim 10, further comprising two angular projections defining two cutting edges angularly spaced opposite each other on a final rib of each auger.

12. The toy according to claim 11, further comprising a housing secured to the frame having an inlet and an outlet and at least partially containing the cooperating augers.

13. The toy according to claim 12, further comprising a collar extending from the inlet into the housing and one or more guides extending from the collar and positioned adjacent the augers.

14. The toy according to claim 13, wherein each auger has a first end and a second end and tapers down from the first end to the second end, the first ends of the augers surround the inlet and the second ends of the augers surround the outlet and each cutting edge on the final rib of each auger crosses over the cutting edge of an adjacent auger of the triangular arrangement at the outlet.

15. A method for stamping and cutting off articles, comprising the steps of:
    providing a frame;
    providing two or more cooperating rollers at the frame, each roller including a peripheral surface with a rib spiraling around the peripheral surface of each roller defining a molding surface at each roller;
    providing a stamp on the molding surface of at least one roller;
    providing at least one angular projection defining at least one cutting edge along a final turn of the rib of at least one roller;
    providing a gear mechanism at the frame in mechanical communication with the cooperating rollers;
    providing a driving mechanism secured to the frame and in mechanical communication with the gear mechanism; and
    rotating the driving mechanism to rotate the gear mechanism and in turn rotating the two or more rollers for stamping and cutting off articles formed at the molding surface of the rollers.

16. The method according to claim 15, further comprising the step of providing two angular projections defining two cutting edges angularly spaced opposite each other on the final turn of the rib of each roller.

17. The method according to claim 16, further comprising the step of providing a third roller cooperating with the two or more rollers in a triangular arrangement, the third roller including a peripheral surface and a rib spiraling around a length of the peripheral surface of the roller defining a molding surface which spirals around the peripheral surface of the roller.

18. The method according to claim 17, further comprising the step of providing at least one angular projection defining at least one cutting edge on a final turn of the rib of the third roller.

19. The method according to claim 18, further comprising the step of providing a hollow housing, having an inlet and an outlet secured to the frame and at least partially containing the rollers and wherein the driving mechanism includes a handle secured to the frame.

20. The method according to claim 19, further comprising the step of providing a collar extending from the inlet into the housing and one or more guides extending from the collar and positioned adjacent the rollers.

* * * * *